United States Patent [19]
Lucht

[11] 3,951,545
[45] Apr. 20, 1976

[54] PHOTOGRAPHIC PRINT APPARATUS
[75] Inventor: Orren J. Lucht, Bloomington, Minn.
[73] Assignee: Lucht Engineering, Inc., Burnsville, Minn.
[22] Filed: Aug. 28, 1974
[21] Appl. No.: 501,036

[52] U.S. Cl. .................................. 355/46; 355/54; 355/71
[51] Int. Cl.² .................. G03B 27/44; G03B 27/76
[58] Field of Search ........................ 355/46, 54, 71

[56] References Cited
UNITED STATES PATENTS

| | | | |
|---|---|---|---|
| 3,169,441 | 2/1965 | Johnson | 355/54 X |
| 3,212,396 | 10/1965 | Schwardt et al. | 355/46 X |
| 3,424,527 | 1/1969 | Bremson, Jr. | 355/46 X |
| 3,588,248 | 6/1971 | Freund et al. | 355/54 X |
| 3,689,149 | 9/1972 | Livingood | 355/46 |

*Primary Examiner*—Richard A. Wintercorn
*Attorney, Agent, or Firm*—Robert C. Baker

[57] ABSTRACT

Photographic printers of versatile character are taught. Disclosed is a printer having a lens carrier assembly which includes at least one subassembly of shiftable lens boards adapted to be moved in and out of an operative position for photographic printing. The subassembly can be moved as a unit out of engagable relationship with power means for shifting the lens boards. The power means for shifting the lens boards is not moved with the subassembly. An alternate subassembly may then be moved into position for operation by the power means. Disclosed also is a composite lens carrier assembly which, as a complete unit, can be entirely removed from a printing apparatus to permit an alternate assembly to be inserted. Additionally disclosed is a new location for a shutter mechanism, at the window into a chamber for the light-sensitive print material. Further, there is disclosed a new negative holder assembly of removable and replaceable elements. This negative holder assembly is capable of a 90° rotary shift and has means for parting a negative mask from a back-up plate in a manner freeing an operator's hands for other tasks. The disclosure permits a photofinisher to employ essentially one basic printing machine, with easily changed elements, for package printing as well as enlargement printing from almost any size of negative.

45 Claims, 12 Drawing Figures

U.S. Patent   April 20, 1976   3,951,545
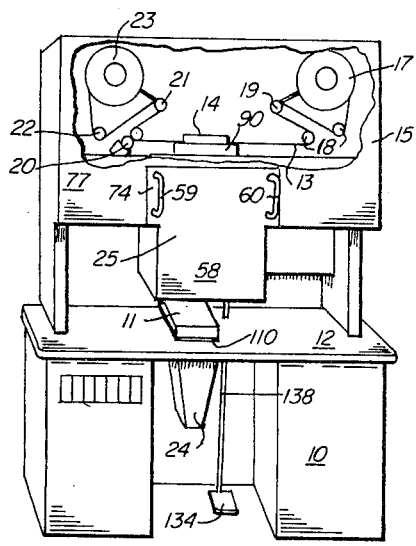
FIG. 1
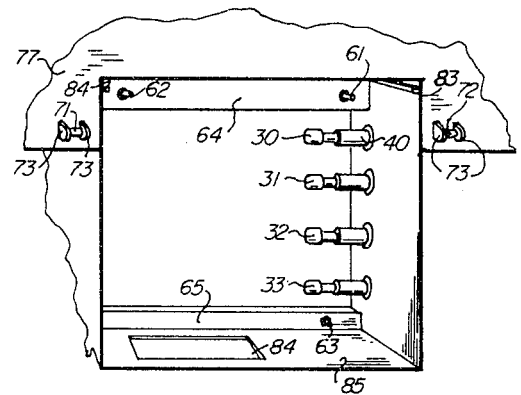
FIG. 3
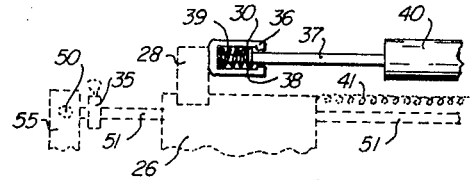
FIG. 4
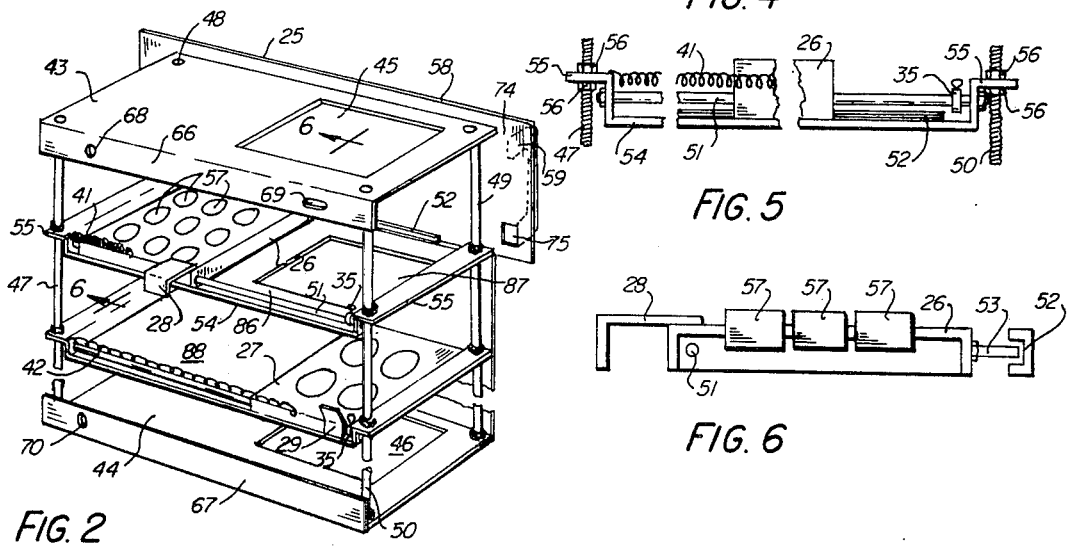
FIG. 2
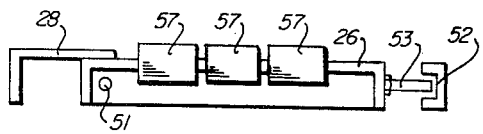
FIG. 5
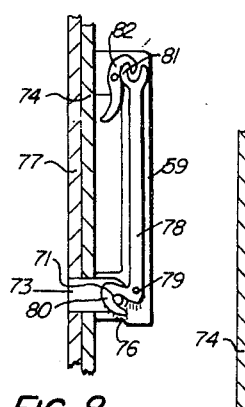
FIG. 6
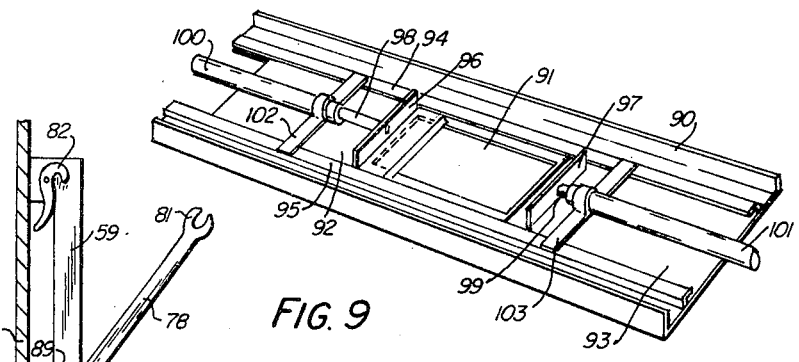
FIG. 9
FIG. 8
FIG. 7

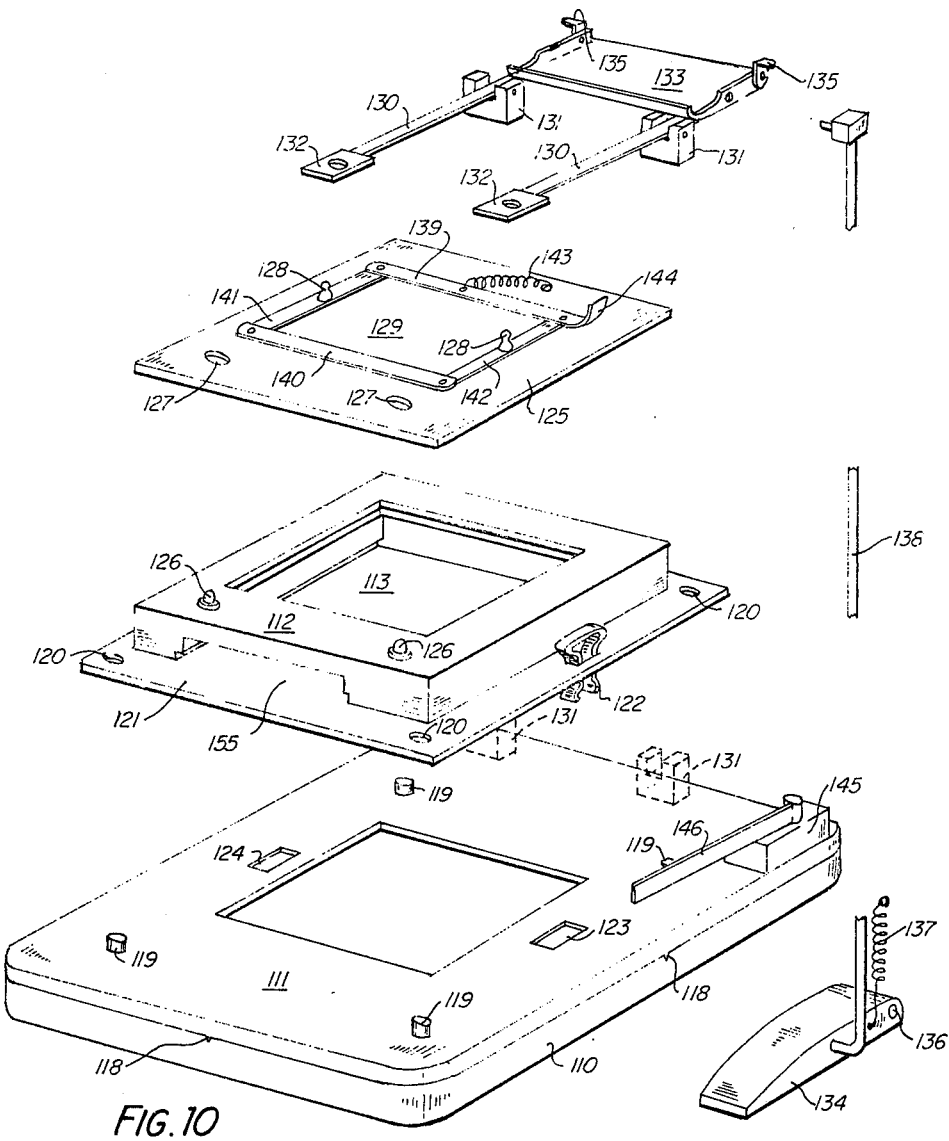
FIG. 10
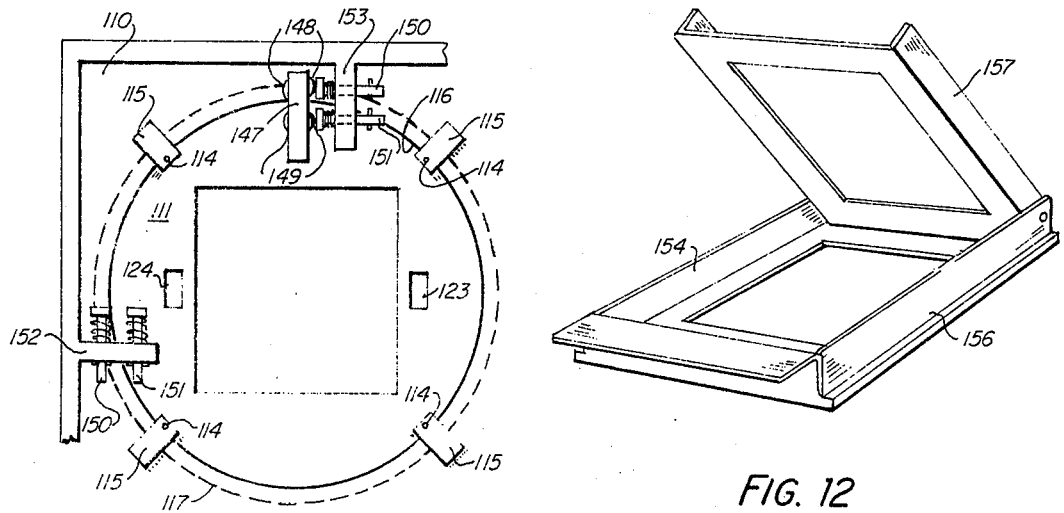
FIG. 11
FIG. 12

PHOTOGRAPHIC PRINT APPARATUS

This invention relates to improvements in photographic printers and to new assemblies for photographic printers.

All photographic printers of this invention comprise a base combination of fundamental elements, the first of which is a frame of base structure. A negative holder assembly is supported by the frame and is adapted to support a negative for photographic printing. Means supported by the frame on one side of the negative holder assembly and spaced apart therefrom is provided for supporting a light sensitive photographic print material. Means supported by the frame on the opposite side of the negative holder assembly and spaced apart therefrom is provided for projecting a light beam through a negative at the negative holder assembly toward print material at the print material supporting means. Additionally, a lens structure or means is supported by the frame in the space between the negative holder assembly and the print material supporting means. This lens means may take the form of a lens carrier assembly.

It is in the first main embodiment of this invention that the lens means takes the form of a lens carrier assembly which includes at least one (or a first) subassembly consisting essentially of a plurality of lens boards (or different lens arrangements). The lens boards are mounted for movement between at least primary and secondary stations for the same. The primary station is that normally occupied by a lens board when at a position of rest. Either station can be the operative station wherein the lens board is located within the path of the light beam from the projecting means. The other station or stations are the inoperative stations wherein the lens board is located out of the path of the light beam. Power means supported by the frame is in engagable relationship with the lens boards, but is disengagable therefrom. Means for actuating the power means permits one to selectively move lens boards between the primary and secondary stations. Especially significant is the fact that means are provided for moving the first or one lens carrier subassembly as a unit out of the space between the negative holder assembly and the print material supporting means. This is done when the power means is at a position of rest. The movement of the entire subassembly simultaneously moves each lens board of it out of engagable relationship with the power means. Thus, by practice of this invention, an alternate assembly or subassembly of different lens character may be placed in engagable relationship with the power means. Complete removal of a lens carrier assembly from the base frame of the printing apparatus is one approach contemplated by this first embodiment.

This first embodiment, and refinements for it as hereinafter discussed, permits extraordinary versatility in printing by those engaged in the photofinishing trade. It is particularly useful for package printing, and permits one to satisfy almost any demand for a package of prints of different size and number from a single negative. More importantly, this first embodiment permits the photographic finisher to easily and quickly change lenses, as a group, so as to retain proper focusing by the apparatus for different sized prints on the light sensitive print material even when the photographic finisher shifts from the printing of one sized negative to that of printing a different sized negative (such as from 35 mm negative to a 70 mm negative). A basic feature of this first embodiment is that it links or combines a fixed position power base (such as cylinders for the power means) with adjustable or shiftable position lenses which may be removed or separated as a group from the power base so as to permit an alternate group of adjustable position lenses to be moved or inserted into position for selective shifting by the power base.

An important embodiment of this invention (not directed to a composite photographic printer but only to a part thereof) is that of a novel lens carrier assembly having a skeletal frame on which subframes for lens boards are mounted so as to be incrementally adjustable with respect to each other. This structure or lens carrier assembly is particularly useful in apparatus characterized herein as the first main embodiment.

A further embodiment of this invention, characterized as the second main embodiment herein, includes the aforenoted base combination of fundamental elements (with or without elements critical to the first main embodiment), plus a critical housing and shutter mechanism arrangement. In this second embodiment, the print material supporting means of the base combination is housed within light-excluding walls of a chamber not enclosing the lens means therewithin. The chamber has a shutter-controllable window located in the path of the light beam between the lens means and print material at the print material supporting means. The window is equipped with a shutter mechanism such as hereinafter described.

Frequently, a photographic finisher is confronted with different sized negatives from each of which various enlargement prints or a package of prints is desired. This second embodiment permits a photographic finisher to do that work by simply altering the lens (or changing an entire lens carrier assembly) of a single machine or apparatus easily and conveniently under ordinary room light conditions. Further, the improved shutter location permits removal of shutters from the space between the negative location and the lens means location, which creates more space in that portion of the apparatus (since lens and negative spacing remains unchanged, relatively speaking, and is relatively critical). This allows an operator more room for visual inspection of negative characteristics.

The third main embodiment of this invention likewise may be used with any or all of the others to provide an improved photographic printer affording great convenience for the photographic finisher. But in addition, this third embodiment may be used entirely separately from elements or details critical to the other embodiments.

In this third main embodiment, the negative holder assembly of the base combination of fundamental elements includes several elements as follows: a foundation plate, a subassembly comprising a negative back-up plate supported by the foundation plate is substantially parallel relationship thereto, means for moving the subassembly in a rotary manner between positions at least at right angles to one another while the subassembly remains in substantially parallel relationship to the foundation plate, a negative mask adapted to be juxtaposed in substantially parallel relationship to the negative back-up plate of the subassembly for movement in the rotary manner therewith, arm means mounted on the subassembly for movement in the rotary manner therewith, means for interlocking the negative mask to the arm means, and means for actuating the art means to part the negative mask from the negative back-up plate. This last-named means is adapted also to permit return of the negative mask to the juxtaposed relationship to the negative back-up plate.

Thus, in the third main embodiment, the negative holder assembly not only permits 90° shift of the negative to form horizontal and vertical prints on a continuous web of light sensitive print material, but also incorporates means for accomplishing parting and return of the negative mask from and to the negative back-up plate in a manner freeing the hands of an operator for other tasks.

Several additional advantages for the various main embodiments and the subordinate embodiments and combinations of this invention, beyond those advantages or benefits aforenoted, are discussed in the following disclosure or will be evident to those skilled in the art as they practice principles taught herein.

Details of this invention will be discussed with the aid of a drawing, made a part hereof, wherein:

FIG. 1 is an overall schematic perspective front showing, partially broken away, of a preferred form for a photographic printer of this invention;

FIG. 2 is a schematic perspective rear view, partially broken away, of a removable lens carrier assembly for the printer of FIG. 1, with the lens carrier assembly shown in removed condition from all other parts of the apparatus;

FIG. 3 is a fragmentary schematic perspective view of the lens structure recess of the apparatus of FIG. 1, shown with the lens carrier assembly removed therefrom.

FIG. 4 is a schematic enlargement, partially in cross-section, of one of the plungers illustrated in FIG. 3, and includes also a phantom showing of elements from the removable lens carrier assembly to illustrate the relationship therebetween;

FIG. 5 is a schematic rear elevational enlargement, partially broken away, of a portion of FIG. 2, showing the subframe arrangement for one lens board of the lens carrier assembly illustrated in FIG. 2;

FIG. 6 is a schematic fragmentary cross-sectional view, taken on line 6–6 of FIG. 2, illustrating a lens board mounting on its subframe;

FIGS. 7 and 8 are schematic side elevations of one handle member of the lens carrier assembly, showing the same in unlocked and locked condition, respectively;

FIG. 9 is a schematic perspective view of a shutter mechanism according to the invention, shown with the shutter mechanism turned upside down from its preferred orientation in apparatus according to FIG. 1; and the Figure includes an illustration of the shutter-controllable window into the chamber for the light sensitive print material of the apparatus;

FIG. 10 is a schematic exploded view, partially broken away, of a negative holder assembly and associated elements according to the invention;

FIG. 11 is a schematic elevational view of the underneath side of the foundation plate and base plate of a composite negative holder assembly; and FIG. 12 is a schematic perspective view of a special effects drawer for the negative holder assembly.

Referring to the drawing, particularly FIG. 1, the first element of apparatus is that of a frame 10 consisting of suitable panels and structural bracing for the support of other elements of the photographic printer. A desk console, as illustrated, is especially preferred for the overall arrangement of the frame and functional elements.

A negative holder assembly 11 is suitably supported on the desk top 12 in a manner permitting that assembly to support a negative at the negative plane for photographic printing.

A web 13 of photographic print material of light sensitive character is supported or held in flattened condition by means such as platen 14 at the print plane or exposure station. This means is supported by the frame and is preferably within a special chamber 15 near the top of the console. The print material is above the negative holder assembly 11 and spaced therefrom. The feeding of the web 13 of print material through the exposure station is suitably accomplished in any customary well known manner. Illustratively, from the payout or supply reel 17, the web 13 passes over guide rollers 18, over a slack takeup roller 19, through the print station under platen 14, between drive rollers 20, over slack take-up roller 21, over guide roller 22, and is wound up on take-up reel 23. Conventionally, the print web is advanced for printing in predetermined increments of distance and under predetermined or manually controlled time conditions, all well known. In short, a variety of controls and programs for the automatic feeding of print webs are well known and may be incorporated with this apparatus. To simplify this disclosure in this respect, reference is here made to the teachings of U.S. Pat. No. 3,212,396 to Schwardt et al, patented Oct. 19, 1965, the disclosure of which is here incorporated by reference.

A light source or means for projecting a light beam is located in a housing 24 on the side of the negative holder assembly 11 opposite the side where the photographic print material 13 is supported. The light source is spaced from the negative holder assembly but the beam from that light source is capable of being projected through the negative at the holder assembly 11 toward print material at the print material supporting means 14. Any suitable light source or means (even a mirror which redirects light from a lateral origination source) may be employed for printing as is well known to those skilled in the art.

Between the negative holder assembly 11 and the print material supporting means 14 is located a housing 25 containing or supporting a lens structure or means. Lenses, of course, effect alteration or focusing of the light beam from the projecting means on its way toward print material at the print material supporting means 14.

A variety of controls are usually included in print apparatus, as is well known. Arrangements and features for more or less automatic or programmed control of various conventional apparatus elements and their function, being well known, are to be noted as optionally includable or usable with the special teachings of this invention.

Attention will not be directed to the first main embodiment of this invention wherein the lens means for the overall arrangement in FIG. 1 comprises a lens carrier assembly and its particular relationship with respect to other elements of the apparatus. In FIG. 1, the numeral 25 broadly designates the housing for a lens means as well as for a composite lens carrier assembly.

At this point it should be emphasized that the lens carrier assembly must include at least one lens carrier subassembly. It may consist of a single lens carrier subassembly as illustrated in the drawings (particularly see FIG. 2). But it may include several subassemblies or groupings of lens boards, with each grouping being shiftable as a unit or group into position for selective lens board movement for photographic printing. This feature will be further explained after detailed discussion of basic principles.

Referring to FIG. 2, the lens carrier assembly includes, as aforenoted, at least a first (or at least one) lens carrier subassembly; and in FIG. 2, the showing is simplified for clarity and includes only one lens carrier subassembly. This subassembly (that is, the entire lens carrier assembly shown in FIG. 2) is supported on the frame in the space between the negative holder assembly and the print material supporting means. It critically includes a plurality of movable lens decks or boards 26, 17. Only two lens boards are illustrated in FIG. 2; but normally at least about three or four lens boards, each carrying a different lens means (or different grouping of lenses) mounted thereon, will be present in a lens carrier subassembly. At least one lens is present on each board; and usually a grouping of lenses is on at least all boards except one. The first lens board 26 in FIG. 2 is illustrated as carrying nine lenses; the second 27, as carrying four.

Each lens board includes or carries some sort of means, such as an abutment means or bracket 28, 29, adapted to be placed in engagable relationship with power means. The illustrated outwardly projecting brackets may be twisted or adjusted in orientation to be hit or engaged by a fixed position power member actuated to move the lens board between primary and secondary stations or positions. Illustratively, if all lens boards are biased so that their primary or "at rest" position is an inoperative position (out of the path of the light beam), they will be selectively moved, one at a time, into the operative position (within the optical path of the light beam from source 24). But it must be recognized that one or more lens boards may be biased in the operative position and moved out of that position under the action of power means in a manner leaving only one lens board in the operative position for photographic printing.

The power means for moving lens boards between primary and secondary stations is adapted to be placed in engagable relationship with the lens boards for that movement. A variety of power means or linkages (cranks, chains, levers and the like) may be useful. However, plungers 30, 31, 32 and 33 are preferred. They are illustrated in FIG. 3 as part of the main body of the apparatus. They are in engagable relationship with lens boards of the lens carrier assembly, but disengagable therefrom. They may even abut against or releasably interlock with lens boards or members fixed to the lens boards; but at the very least, they are in engagable relationship to the lens boards, and at least engage or hit the lens boards when the power is actuated. Plungers or other power means for moving lens boards might logically be looked upon as elements to be fixed in a lens carrier assembly or subassembly in order to form reliable relationships; but one benefit of the teaching hereof is that such elements, not being fixed as part of that assembly, do not add their weight to it. Thus, lens carrier assemblies which are entirely removable from the main frame can be formed so as to be relatively light in weight and easily handled in removal by a single operator, without necessarily requiring a special support truck or the like.

The actuation of plungers or like power members is easily accomplished by solenoid or pneumatic means, as is well understood in the art; and the illustrated pneumatic cylinders 40 in FIG. 3 are but one approach for plunger actuation. Each cylinder 40 may be normally actuated by a separate switch or lever for it; and in this manner an operator may move selected lens boards between primary and secondary stations and present a single lens board in the operative station for printing. Such actuation of power cylinders 40 is well known; and likewise, programmed or computerized actuation of pneumatic cylinders or the like in package printing apparatus where the power means is not disengagable from the lens boards is well known in the art. Such prior knowledge is incorporated by reference.

Preferred lens carrier assemblies or subassemblies of the invention include stop means for preventing overtravel of each lens board when it is moved or held in the operative station or position. As illustrated in FIGS. 2, 4 and 5, the stop means may take the form of a ring member 35 adjustable in position along a mounting rod for the lens board and adapted to be fixed in a selected position by a set screw or other means. The stop means is placed in the proper position by trial and error, as will be readily appreciated by those skilled in the art. Any suitable stop means may be employed to perform the function of preventing overtravel. A single adjustable screw at the end portion of the subframe for a lens board may be oriented to project toward the lens board and serve as a stop member.

A further preferred feature is that of some sort of yielding means adapted to absorb any excess energy of motion effected by power means after the movement of a lens board is stopped by the stop means 35. The yielding means may be a part of the parts forming the contact or engagement between a plunger or other power means and an abutment member or means on a lens board. Suitably, as shown in FIG. 4 (which schematically illustrates the relationship between bracket 28 of lens board 26 in FIG. 2 and plunger 30 in FIG. 3), the head 36 of plunger 30 may incorporate or contain the yielding means. The plunger rod may be provided with a ferrule or collar 38 against which a spring 39 within the head of the plunger is based and extends from that collar 38 to the end of the head 36 adapted to strike against the abutment means or bracket 28 on the lens board 26. Thus, as illustrated in FIG. 4, the head 36 of the plunger effectively moves lens board 26 toward an operative position after the head 36 strikes the abutment means or bracket 28. After the plunger effectively rams the lens board 26 home against the stop means 35, further slight movement of the plunger shaft 37 compresses the spring within the head of the plunger but does not cause further movement of the lens board itself. Most important, positive ramming of the lens deck or board into the full operative position is reliably accomplished. If desired, the yielding assembly at the head end of the plunger shaft might be mounted upon a lens board as an abutment structure for it; and then the yielding action itself will take place within the "abutment means" fixed to the lens board. Under such circumstances, the plunger might simply comprise a shaft free of any yielding means associated per se with it. Alternately, the yielding means might be built into the power cylinder 40 of the plunger; for example, air actuated plungers may rely upon slight air compression as a yielding means at the end of the stroke forcing a lens board into a desired location.

The lens boards of the lens carrier assembly may all be biased in an inoperative station out of the optical path of the light beam from the light source 24; and this is illustrated in the drawing. As shown in FIGS. 2, 4 and 5, a coiled spring 41 can perform this biasing function when one end is fixed to the lens board 26 and the other to a frame part of the lens carrier assembly. Biasing spring 42 for lens board 27 is shown in extended condition in FIG. 2 because the lens board 27 is there shown in the operative station.

Referring to FIGS. 2 and 5, details with respect to the base frame of a preferred lens carrier assembly of the invention will be discussed. As previously mentioned, the lens carrier assembly must include at least one subassembly and may consist of only one. The frame includes a top plate 43 and bottom plate 44 each having an aperture or window 45, 46 appropriately positioned therein for the path of the beam of light from the light source. Whether or not these apertures are fitted with shutters is optional, but unnecessary. Extending between the top 43 and bottom 44 plates at perimeter locations which define the internal space of the illustrated lens carrier assembly are post members 47, 48, 49, 50. In preferred practice, these posts are threaded rods. The post members are substantially parallel to one another and spaced apart from one another. They form the main part of the skeletal frame of a lens carrier subassembly (that is, the total assembly illustrated in FIG. 2).

Each lens board in a lens carrier subassembly is carried or mounted upon a subframe. The subframes are substantially parallel to one another and in spaced relationship to one another. They are transversely mounted upon the threaded rod members. The subframe for lens board 26 (see FIGS. 2, 4, 5 and 6) is illustrative and includes a main track or rod member 51 for slidable movement of lens board 26 therealong. It also includes a suitable means for mounting the rod or track member 51 so that it is oriented transversely or at a right angle to the threaded rod members 47–50 of the skeletal frame of the lens carrier assembly. Further, the subframe includes an associated runner track 52 in substantially parallel relationship to the rod 51. The runner track 52 serves as a guide member and may consist of a grooved member. Lens board 26 has depending flanged ends which are mounted on rod 51 for sliding; thus a two point contact is formed, one at each end of the lens board along one side thereof. A cooperative member such as a track follower or narrow foot 53 on lens board 26 is guided by the associated runner track 52 during the slidable movement; and this follower member 53 forms the third point of a three point suspension for a lens board on a subframe. A foot is suitably formed out of nylon or Teflon (a polytetrafluoroeythylene) or some other plastic exhibiting self lubrication characteristics or low friction. But the member 53 might consist of a roller or other means for following the runner track.

The main track 51 and runner track 52 may be fixed on a frame 54 which in turn is mounted through flanged portions or brackets 55 on the threaded rod members 47–50 of the skeletal frame of the lens carrier assembly. The frame 54 may in fact be a baffle plate 86 with a window 87 in it. (The baffle plate 88 for the lens board 27 likewise has a window in it; but the window is obscured because the lens board 27 is shown in the operative position.)

Each subframe for a lens board is preferably capable of being incrementally adjusted along the threaded post members 47–50 of the skeletal frame itself. Such adjustment varies the spaced relationship between the lens boards. More significantly, it permits alteration of the focusing action of lens means carried by the lens board of the subframe. Thus, by incrementally adjusting the brackets 55 of the frame 54 of the subframe assembly for each lens board, one can adjust with rather great precision the exact focusing action of the lenses carried by a lens board on the subframe. After the proper focusing action is gained by adjusting threaded members or nuts 56 on opposite sides of parts 55, the nuts are tightened to preserve or fix the focal position of the lens board for all future use so long as the lenses 57 in it are not replaced or otherwise changed.

While various arrangements for lens boards are possible and within the board scope of this invention (even including hinged arrangements and tilting action between operative and inoperative stations), by far the most preferred arrangement from the standpoint of a combination of factors (such as economy of manufacture, ease of adjustment for lens focusing, and reliability in performance) is that arrangement as illustrated where the subframe of each lens board is such that the lens boards are preferably all in substantially parallel and stacked and spaced relationship to one another in the shiftable lens board subassembly.

It is emphasized that the power means, such as plungers 30—33 (see FIG. 3), for moving each lens board of a lens carrier subassembly is located and supported on the main frame of the apparatus. The illustrated plungers are suitably located to project or be operable in the recess or space for the lens carrier assembly. While the power means may releasably interlock with lens boards, it is generally preferable to bias the illustrated plungers, when at a position of rest, so that the head end of each plunger 30—33 is spaced in a separated relationship (but engagable relationship) with respect to lens boards. Each plunger is suitably spaced a centimeter or so (or possibly a greater spacing) from the abutment means (such as brackets 28 and 29) for the respective lens board which is adapted to be moved by the plunger or power member.

A critical feature is that each plunger must not interfere with the movement of a complete lens carrier subassembly, as a unit, out of the space (between the negative holder assembly and the print material) when the power means or plungers are at a position of rest. Such movement (whether by removing a lens carrier assembly and its subassemblies entirely from the recess illustrated in FIG. 3, or by shifting a lens carrier subassembly within a larger lens carrier assembly having two or more such subassemblies) always simultaneously causes each lens board of the subassembly to move out of engagable relationship with the power means and permits an alternate lens carrier subassembly of different lens boards to be placed in such engagable relationship.

In the illustrated showing, each plunger is in engagable relationship to a lens board, but moves a short distance after actuation before hitting an abutment bracket of a lens board. When actuated to move a lens board, a plunger such as plunger 30 (see FIG. 4) moves into contact engagement with an abutment means 28 of the lens board, and then moves the lens board from one station to another and holds it there. (Of course, the yielding spring 39 in the head 36 of plunger 30 is stronger than the biasing spring 41, as is evident from the functional performance and relationships aforediscussed.)

A cover plate 58 is suitably fixed to the front of a lens carrier assembly as a part of it. The cover plate 58 may be united to the top 43 and bottom 44 plates by bolts or any other suitable fastening means. Appropriate bracing or reinforcement elements may be added as needed or desired. (However, a cover plate, such as plate 58, might be entirely separate from the skeletal frame for the lens carrier assembly or subassemblies. It may be hinged permanently on the main frame of apparatus designed to permit complete removal of an entire lens carrier assembly.) In the illustrated arrangement, handle members 59 and 60 are mounted on the cover plate 58 to provide ease of gripping it for removal and replacement in the lens structure space or recess of the main body of the apparatus.

Where a composite lens carrier assembly is designed to be completely removed from the main body of apparatus and several different lens carrier assemblies inserted in the recess (as illustrated in FIG. 3) adapted to receive them, it is important to provide cooperatively mating members on both the main frame and on the totally removable composite lens carrier assemblies. This feature is important in order to avoid repeated re-adjustment of the lens decks or boards of the assembly after establishing a proper adjustment for required focusing action by the lenses thereof. Any completely removable lens carrier assembly should be consistently and reliably positioned in the apparatus every time it is reinserted. Illustratively, pairs of cooperatively mating members for such consistent re-positioning may comprise male and female members. Either the male or female member may be placed on the main frame of the apparatus or on the lens carrier assembly. Suitably, a pattern of three male members 61, 62, and 63 (see FIG. 3) are located in the lens structure space adapted to receive the lens carrier assembly. They are suitably mounted on plates or beams 64 and 65 fixed to the main frame. Preferably, each pin 61, 62 and 63 has a ferrule or collar at its base portion proximate to plate 64 or 65. The collar limits the slide of a female member over the pins. The portion of the shaft of pins 61–63 adjacent the collar is suitably cylindrical; and the outward end part of the pins is beveled or tapered to a reduced diameter, which permits a female member slightly out of position to be received and shifted in position as the mating members are pushed together.

The lens carrier assembly (see FIG. 2) is suitably equipped with rigid rear plates or panels 66 and 67 which carry a pattern of three holes or recesses 68, 69 and 70 adapted to mate with pins 61, 62 and 63, respectively.

If desired, one pair of the mating members may serve as the main orientation pair; for example, pin 61 and hole 68 may perform this function. Hole 68 should be as nearly cylindrical and perfect in its fit over pin 61 in FIG. 3 as possible.

To compensate for slight errors in manufacture, or to allow for greater freedom from rigid tolerances in manufacture, the hole 69 on the lens carrier assembly may be elongated horizontally in horizontal alignment with hole 68 to permit a slight horizontal shift at that location during the mating action. Hole 70 may be elongated vertically in vertical alignment with hole 68 to permit vertical shift at that location. The first auxiliary pair of cooperatively mating elements (which permit horizontal movement) and the second auxiliary pair of cooperatively mating elements (which permit vertical movement) are each spaced from the main orientation pair and elongated at right angles to each other but in alignment with the main orientation pair. Basically, a three point suspension or mounting of the lens carrier assembly is provided.

Any suitable means may be employed to releasably lock a totally removable lens carrier assembly into its proper position in the apparatus. For example, a locking assembly may be incorporated as part of handle means 59 and 60 on a totally removable lens carrier assembly. Illustratively, the main frame may have mounted upon it (see FIG. 3) a pair of rod members 71 and 72, held in spaced condition from the front panel 77 by mounting brackets 73. The handle members 59 and 60 may be identical in character; and handle 59 is taken as illustrative. It is mounted on ear 74 of the front plate 58 of the lens assembly. A hole 75 (see FIG. 2) extends through ear 74 for receiving the rod 71 and its associated brackets 73. Referring now particularly to FIGS. 7 and 8, the lower spacing leg 76 of handle 59 likewise receives at least rod 71 mounted on the front panel 77 of the apparatus. Handle 59 carries a lever 78 mounted to pivot about pin 79. One end of the lever carries a hook or cam element adapted to receive rod 71 and pull against rod 71 as the part of lever 78 on the opposite side of pin 79 is pushed toward handle 59. This action seats the lens carrier assembly solidly in the lens structure recess at the cooperatively mating orientation elements aforediscussed. At the free end of lever 78 is finger element 81 adapted to be releasably hooked by a trigger latch or hook 82. The trigger latch 82 locks the lens carrier assembly into position, but is easily released by finger pressure.

As a further feature assisting the ease of placement of a completely removable lens carrier assembly into position, alignment guide rails 83 and 84 may be fixed to the interior of the lens structure space for guiding the lens carrier assembly into position. The side edges of the top plate 43 of the lens carrier are rested on rails 83 and 84 (or on roller bearings of the rails) during the sliding of the lens carrier assembly into the main frame.

Instead of employing a lens carrier assembly completely removable from the apparatus, one may employ an assembly which more or less remains as a premanent part of the apparatus but includes within it at least two or three lens carrier subassemblies which can be shifted as a unit within the apparatus. For example, each subassembly may comprise a group of lens boards, each of which is shiftable between primary and secondary stations, as aforediscussed, within the subassembly. One subassembly may have lens boards arranged to be useful for printing from a 35 mm negative, another a 46 mm negative, and another a 70 mm negative. Each subassembly may be rotated or otherwise shifted or moved, as a unit, in and out of the space between the negative holder assembly and the print material when the fixed power base or power means is at a position of rest. When in that space, the lens boards of a subassembly are in the engagable relationship with the power means, but easily disengaged or removed from that relationship. They are disengaged by simply moving the subassembly, as a unit, out of that space and moving another thereinto, either by manually doing so or by a power assist.

A window 84 for the optical path of the light beam is located in the bottom panel 85 of the lens structure recess; alternately, the entire bottom panel may be a window or may be omitted.

Referring now to FIGS. 1 and 9, the second main embodiment of the invention will be discussed. A critical feature of this embodiment is that the entire chamber 15 (holding the pay out 17 and take up 23 reels and the web 13 of print material extending therebetween) is formed of light-excluding walls. A shutter mechanism 90 is interposed between the lens structure or composite means 25 and the print material 13 at the print material supporting means 14 of the print station. The shutter mechanism 90 controls the blocking and unblocking of a window 91 into the chamber 15; and therefore, the shutter 90 serves as the controlling shutter for printing on the print material. The shutter may vary greatly in design. Suitably, it includes a pair of shutter members 92 and 93; and these suitably may be plates adapted for sliding movement. Each may be guided in movement by a track member or members 94 and 95, suitably grooved or of U-shape cross section. The shutter plates 92 and 93 slide in the groove of the tracks 94 and 95. A flange 96 and 97 depends downwardly from each shutter plate 92 and 93. (FIG. 9 is an upside down view of the window 91 and shutter mechanism 90.) A shaft 98 and 99 extends outwardly from an actuation cylinder 100 and 101 and is fixed to the respective flange 96 and 97 on the shutter plate 92 and 93 controlled by the cylinder 100 and 101. Each cylinder 100 and 101 is fixed by a bracket 102 and 103 to a frame element such as tracks 94 and 95. Pneumatic or air solenoid actuation cylinders are suitably employed; but other means for actuation of the power elements 100 and 101 may be used.

Heretofore, shutter members designed for movement along a track (and heretofore only located between a lens structure and negative holder or below a negative holder) have operated on the principle of one shutter member serving as the primary member and the other serving as a secondary or follow up member. Both members of such known shutters have then been moved as a unit in the opposite direction after the primary member has moved to unblock a window and the secondary has followed up to block the window.

But according to this invention, either shutter member of the mechanism illustrated in FIG. 9 may serve as a "primary" member for unblocking or opening the window and the remaining member then serves as the follow up or "secondary" member for blocking. Thus unblocking is accomplished from either direction; and blocking is accomplished in a follow up manner in the same direction as the unblocking occurred. Of course, manual operation of such shutter members is possible; but automatic operation is especially desired and permits more precise control of the exposure time. Automatic operation may be accomplished in a variety of ways. Illustratively, a button operated switch may send a single surge or pulse of electrical energy to a time delay relay in association with a flip-flop switch. The initial pulse passes through to actuate movement by one air solenoid and simultaneously changes the flip-flop switch so that the delayed pulse from the relay serves to actuate movement by the other. The next time the button operated switch is pressed, the initial surge passes through the time delay relay through to the air solenoid last moved by the previous cycle, and the follow up delayed surge goes to the other air solenoid. Considerable sophistication and complexity can be included in the control circuitry for programming shutter operations, as is well understood in the art.

The illustrated shutter arrangement allows one to achieve rather precise control of light passage to the print material. The exposure time at each increment of distance along the window can be maintained at the same level by shifting the shutter plates at the same rate of speed, which is easily accomplished by employing identical power means 100 and 101.

Further, the new shutter location permits complete blocking of light or exclusion of light from the chamber containing the light sensitive photographic print material. It thus permits a variety of activity under normal room temperature light conditions without exposing or adulterating the light sensitive photographic print material within the chamber which houses it. Especially desirable is the fact that the lens structure, whether of the special lens carrier assembly type as preferred, or of a less sophisticated type, or a single lens, may be removed or altered under ordinary light conditions as desired by an operator without damage to the print material.

The third embodiment of this invention will be described by reference to FIGS. 1, 10 11 and 12. This embodiment deals with the negative holder assembly 11 and associated elements. This assembly includes a foundation plate 110 (FIGS. 1 and 10) which is supported by the frame and is adapted to permit the passage of the main light beam from source 24 centrally therethrough.

A subassembly is supported over the foundation plate 110. One element of the subassembly is a base plate 111 which also is adapted to permit the passage of the main light beam centrally therethrough. Another element of the subassembly is a negative support or back-up plate 112 adapted to permit the passage of the main light beam centrally therethrough. The plates 110, 111, and 112 are in substantially parallel relationship.

The negative back-up plate suitably may be equipped with a diffusion light transmitting plate of known character at the window 113 of it, as well as with a glass support for a negative at the window. Both the diffusion plate and glass plate may rest on ledges in window 113; both may be easily removed for cleaning and for the purpose of substituting alternate or different types of diffusion structures. If desired, either or both may even be omitted or removed and printing accomplished without them. However, a glass plate for backing-up the negative is generally preferred.

The base plate 111 is suitably interlocked with the foundation plate by employing foot members which have heel 114 and toe 115 ends (see FIG. 11). Heels 114 are fixed to the underneath side of the base plate; toes 115 extend over the underside of a circular opening 116 in the foundation plate 110 and are not fixed to the foundation plate. The base plate 111 is larger than the circular opening in the foundation plate. A circular roller bearing track 117 suitably is located between the base 111 and the foundation 110 plates to reduce friction for movement of the base plate 111 in a rotary manner between positions at least at right angles to one another. Further, for convenience in terms of achieving true right angle positions, the base and foundation plates may be equipped with any suitable cooperative members 118 which releasably interlock against incidental rotational movement when the subassembly is in either position 90° apart. Other means (such as electrical magnetic means) may alternately be employed to hold the subassembly in positions 90° apart.

The base plate 111 carries posts or pins 119 in spaced relationship. They extend upwardly from the base plate and are adapted to cooperatively interlock or mate in a releasable manner with recess or holes 120 in the base or flanged perimeter lower part of the composite negative back-up plate 112. Additionally, a spring interlock fastener 122 may be mounted on the negative back-up plate for releasable interlocking in a recess or hole 123 in the base plate. An additional spring interlock on the opposite side of the window 113 may be employed for mating with the hole 124 of the base plate 111. A variety of means may be employed for removably or temporarily interlocking the negative back-up plate 112 to the base plate 111 for rotary movement as a unit therewith, with or without spring held interlocking such as illustrated.

Next is a negative mask or means 125 for holding a negative in substantially flat condition next to back-up plate 112. It permits the optical passage of the light beam centrally therethrough. The negative mask 125 is adapted to be juxtaposed in substantially parallel relationship to plate 112. Further, cooperative releasable interlock fasteners or mating elements, such as pins 126 on plate 112 and holes 127 on mask 125, assist in holding the mask against rotary movement relative to plate 112. The negative mask 125 is releasably interlockable to the back-up plate 112 at a predetermined orientation with respect thereto; both the mask 125 and plate 112 may be removed as a unit from other elements, while preserving their interlocked relationship.

The negative mask 125 is mechanically separable or partable from the negative support plate 112 so that an operator may use both hands to position a negative, or to conduct other operations while holding the negative mask in separated or parted relationship from the plate 112. Illustratively, for this purpose, a pair of knobs 128, or pins with enlarged heads, are fixed in spaced relationship (one on each side of window area 129) on the upper part of the negative mask. Above the negative mask in spaced relationship therefrom are a pair of arm lever members 130. Each arm 130 is pivotally mounted in a mounting block 131 which in turn is mounted on a member of the subassembly (such as the negative back-up plate 112 or the base plate 111). The blocks 131 are not desirably mounted on the negative back-up plate 112 except in those rare cases where easy removability of the plate 112 is unnecessary. As shown in FIG. 10 by phantom iluustration, the preferred mounting for blocks 131 is on the base plate 111 for rotational movement therewith. Both arms 130 and their mounting blocks 131 are positioned so as to be at a location out of the path of the main light beam through window 129. The outer end of the arms 130 above knobs 128 is equipped with releasable lock elements or members of any suitable type adapted to pinchingly receive the enlarged head of knobs 128 on mask 125. The inward end of each arm lever 130, on the opposite side of pivot point 131, extends in free unattached relationship. The inward ends are adapted to be pressed downwardly and simultaneously elevate or part the negative mask 125 from the negative support plate 112.

A preferred means for actuation of the arm means 130 is by a cam or actuation plate 133, preferably actuated by a foot pedal 134. Cam 133 is pivotally mounted by brackets 135 to the main frame of the apparatus. The foot pedal 134 is mounted on the main frame (or a separate stand) in a manner permitting pivot movement of it at axis 136. Spring 137, fixed on opposite ends to the pedal 136 and a frame element, biases the foot pedal 134 in an upward position. Linking arm 138 is connected between the foot pedal and cam plate 133 so that depression of the pedal 134 pivots plate 133 downwardly on the free ends of arms 130 and elevates the ends of those arms releasably attached to the mask 125. Thus, the mask 125 is elevated or separated from plate 112.

Preferably carried on the negative mask 125 is a means for cropping a negative. Illustratively, two cropping blades 139 and 140 are mounted in parallel relationship to each other at the ends of pivotable spacer blades 141 and 142. Spacer blades 141 and 142 are substantially parallel to each other and mounted for pivot action at knob members 128. Each spacer blade is so mounted at a central point between the ends thereof connected to the cropping blades. The result is that the two cropping blades and spacer blades form a rectangle when in relaxed condition. One of the cropping blades 139 is fitted with a spring member 143 fastened at one end to it and at the other end to a plate portion of the negative mask. This spring biases the cropping blades in the relative position illustrated in FIG. 10 (with the blades located at substantially their maximum distance apart). An abutment member or upstanding bracket 144 at one end of one cropping blade 139 is adapted to be struck by a power member capable of moving that cropping blade 139 toward the left in FIG. 10. This in turn shifts the other cropping blade 140 to the right; and simultaneously, both blades move toward each other slightly depending on the degree to which the first or main cropping blade 139 is shifted toward the left. The shifting of the cropping blades causes them and the spacer blades 141 and 142 to move into a parallelogram relationship. A major advantage arising from the special location and operation of the cropping blades 139 and 140 as taught herein is that of improving the sharpness of the cropping line along the edge. Heretofore, cropping blades have never been, insofar as is known, at the location specified herein, which is on the side of the negative mask away froom the negative back-up plate and away from the light source 24. And the advantages of such sharper cropping have not therefore been heretofore available. If desired, a cropping assembly comparable to that illustrated may additionally be employed in a transverse direction on the negative mask, to achieve cropping on all four sides of an image.

Power means 145 for shifting the main cropping blade 139 toward the left is mounted on a plate 111 of the subassembly which is capable of 90° rotation. An arm 146 extending from that power means 145 serves as the actuating contact member which abuts against the abutment means 144 of the cropping blade 139. The power means 145 suitably may comprise a rheostat controlled solenoid member or other comparable means. Electrical connection to power means 145 may be accomplished in a variety of ways. The wires for it might be allowed to shift as base plate 11 is shifted. A continuous circular band contact for electrical connection during the shifting of plate 111 might be employed. In FIG. 11, a means is shown for supplying electrical energy to means 145 for the actuation of means 145 at either extremity of 90° movement for plate 111. A base insulator 147 is fixed to the underside of the base plate 111 and rotates with plate 111. Base insulator 147 carries electrical connector conductors 148 and 149 which protrude from opposite sides of it and to which the lines to the power means 145 are connected. Foundation plate 110 carries, at approximately 90° spaced apart locations, a dual set of spring biased connectors 150 and 151 held on brackets 152 and 153 rigidly fixed to a frame part of the foundation plate 110. These are stationary; and electrical wires to these connectors from an electrical source likewise remain stationary.

A drawer 154 is adapted to slide into recess 155. Drawer 154 consists of base 156 and cover 157 appropriately hinged together. Each is equipped with a window adapted to permit passage of the light beam. The window may be open or glazed. The drawer 154 is suitably equipped with a flange or other track means for cooperative relationship with a groove or other means in the drawer space 155 of the composite negative back-up plate 112, as illustrated. Filters or shading or tinting materials (or vignetting or dodging or burning materials) may be placed in drawer 154 and the drawer inserted in the space 155 to create whatever special effects in printing as may be desired.

A negative support assembly such as illustrated gives many new conveniences to the photofinisher and allows him to improve his product and to do so with reduced labor expense and reduced waste of print material. Confronted with a 70 mm negative, he selects a negative back-up plate 112 (and its drawer) and a negative mask 125 especially designed for that 70 mm negative and adapted to be used in the assembly of elements shown in FIG. 10. Before placing the plate 112 and mask 125 on the base 111, he may insert the negative in position between the plate 112 and mask 125; and he may also insert the special effects he estimates are needed in drawer 154. He can then visually inspect the subassembly over an auxiliary light source separate from the illustrated apparatus. If changes for the special effects are needed, he can easily make them. If the diffusion plate 113 gives an undesired result, he may remove it and use another. (Because the diffusion plate is preferably spaced from a glass negative support, and is within the back-up plate 112 at a location out of the plane for the negative in the assembly, little danger exists for a speck of dirt on a diffusion plate to show up on a finished photographic print.) When the operator is satisfied that the print results are likely to be as desired, he places the plate 112 and mask 125 on the base plate 111. He may then re-adjust or correct the position of the negative by elevating the mask 125 by foot pedal 134. Both of his hands are free for any negative positioning or other corrective steps he deems necessary. He may make one or more "horizontal" format prints on the print material, and then shift the entire subassembly (i.e., base plate 111, negative support plate 112, negative mask 125, and associated elements) to a 90° position for the making of "vertical" format prints. In doing so, the portion of mask elevation arms 130 shown in FIG. 10 as being located underneath the control or cam plate 133 will be moved or shifted out from underneath cam plate 133, rendering foot pedal 134 inoperative for elevating negative mask 125. (However, a duplicate assembly of cam plate 133, foot pedal 134, and associated elements might be included in the apparatus for the lifting of mask 125 after the 90° shift, or a shiftable mask elevation assembly might be employed, if desired.) After concluding the "vertical" format printing, the subassembly is returned to the position illustrated in FIG. 10 and the printing of other 70 mm negatives may proceed by repeating the steps aforenoted.

But if a 35 mm negative is next to be used in printing, the printer need only remove mask 125 for the 70 mm negative and select a mask 125 for the 35 mm negative, and proceeds otherwise as aforenoted. He may change the diffusion plate in the negative back-up plate 112; but he ordinarily will employ the same basic back-up plate or pressure plate regardless of negative size. The composite total negative support assembly therefore permits ease of replacement of critical parts for essentially any sized negative as desired; and the composite total assembly may be used in printing apparatus solely designed for enlargement printing or in more versatile apparatus such as that capable also of use in package printing operations.

And by far the greatest versatility is provided when at least basic features from all three embodiments of this invention are incorporated in a single apparatus. It is then that the investment of the photofinisher in apparatus may be kept at a relatively low level and still give him the capability of easily and conveniently handling almost any printing request, regardless of negative size. Confronted with different negative sizes, an operator selects the correct negative mask for the negative size to be printed, and selects the correct lens carrier assembly or subassembly of lens boards for that negative size. Installation of each in the apparatus is simple, and is quickly and easily accomplished without significant down time (that is, time during which the apparatus is not put to use for printing).

As is well understood in the art, the interior surfaces of the housings of the apparatus are preferably black or non-reflective except where mirrors or the like may be employed, optionally, to alter the path of a light beam. Further, additional structures or features may be incorporated with elements of the invention. Shutter blades may be beveled at their meeting edges and equipped with strip material to better seal out light. Means for automatic shifting of a negative between 90° positions is well known and may be incorporated in this new apparatus for shifting the subassembly of the composite negative holder assembly. The relative arrangement of elements making up components and the whole of the apparatus is such that an upside down arrangement as compared to that illustrated may be employed, if desired, with reliable results.

That which is claimed is:

1. In a photographic printer comprising a frame, a negative holder assembly supported by said frame, said assembly being adapted to support a negative for photographic printing, means supported by said frame on one side of said negative holder assembly and spaced apart therefrom for supporting light sensitive photographic print material, and means supported by said frame on the opposite side of said negative holder assembly and spaced apart therefrom for projecting a light beam through a negative at said negative holder assembly toward print material at said print material supporting means, the improvements comprising, in combination:

i. a lens carrier assembly supported by said frame, said lens carrier assembly including at least a first lens carrier subassembly supported in the space between said negative holder assembly and said print material supporting means, said first lens carrier subassembly consisting essentially of a plurality of lens boards mounted in substantially parallel stacked and spaced relationship to one another, each said lens board having different lens means mounted therein, each said lens board being mounted for movement within said subassembly between at least primary and secondary stations for the same, said primary station being a station normally occupied by a said lens board when at a position of rest in said subassembly, either said station for any said lens board of said subassembly being an operative station wherein the said lens board is located within the path of the light beam from said projecting means and the other said station for the said lens board being an inoperative station wherein the said lens board is located out of the path of said light beam, ii. power means supported by said frame, said power means being in engagable relationship with lens boards of said first lens carrier subassembly but disengagable therefrom, iii. means for actuating said power means to selectively move lens boards of said first lens carrier subassembly between said primary and secondary stations, and iv. means for moving said first lens carrier subassembly as a unit out of said space when said power means is at a position of rest, which movement of said subassembly simultaneously moves each said lens board of said subassembly out of said engageable relationship with said power means whereby an alternate lens carrier subassembly of different lens boards may be placed in an engageable relationship with said power means.

2. The photograpic printer of claim 1 additionally comprising cooperatively mating members on said frame and on said lens carrier assembly, said mating members being adapted to permit complete removal of said lens carrier assembly as a separate distinct unitary structure, not including said power means, from its position of support by said frame when said power means is at said position of rest.

3. The photographic level, of claim 2 wherein said cooperatively mating members on said frame and on said lens carrier assembly include male and female members.

4. The photographic printer of claim 1 wherein said power means comprises a plurality of power members, each said power member being supported by said frame in engageable relationship with a respective lens board of said first lens carrier subassembly.

5. The photographic printer of claim 4 wherein each said lens board includes abutment means adapted to be engaged by a said power member.

6. The photographic printer of claim 5 wherein each said power member when at a position of rest is spaced from the respective abutment means engagable by it.

7. The photographic printer of claim 1 wherein said lens carrier assembly additionally includes stop means for preventing overtravel of each said lens board when such lens board is moved into said operative station.

8. The photographic printer of claim 7 additionally comprising yielding means adapted to absorb any excess energy of motion effected by said power means after the movement of a said lens board is stopped by said stop means.

9. The photographic printer of claim 1 wherein said lens carrier assembly additionally includes means for biasing each said lens board in said primary station therefor.

10. The photographic printer of claim 1 wherein said subassembly comprises means for incrementally adjusting the spaced relationship between said lens boards.

11. The photographic printer of claim 1 wherein said lens carrier assembly comprises a skeletal frame having substantially parallel spaced apart post members, a subframe for each said lens board of said carrier assembly, each said subframe being mounted transversely upon said post members in substantially parallel spaced relationship one to another, and each said subframe being incrementally adjustable along said post members to vary said spaced relationship and thereby vary the alteration of said light beam effected by the lens means of the lens board of said subframe.

12. The photographic printer of claim 1 wherein each said lens board is mounted on a subframe, and each said subframe comprises a main track and an associated runner track in cooperative relationship, each said lens board being mounted on a main track for slidable movement therealong between said primary and secondary stations, and each said lens board having a member guided by said associated runner track during said slidable movement.

13. The photographic printer of claim 1 additionally comprising means for releasably locking said lens carrier subassembly in said space between said negative holder assembly and said print material supporting means.

14. The photographic printer of claim 1 additionally comprising:

a. housing means enclosing print material at said print material supporting means within light-excluding walls of a chamber not enclosing said lens carrier assembly therewithin, said chamber having a shutter-controllable window thereinto located in the path of said light beam between said lens carrier assembly and print material at said print material supporting means, and b. a shutter mechanism at said shutter-controllable window of said chamber, said shutter mechanism being adapted to be closed to block and opened to unblock the passage of said light beam through said window, said shutter mechanism being normally closed and adapted to be momentarily opened for passage of said light beam through said window for printing on said print material.

15. The photographic printer of claim 1 wherein said negative holder assembly comprises a negative back-up plate and a negative mask adapted to be placed on opposite sides of a negative, and includes means for parting said negative mask from said negative back-up plate, and means for removably interlocking said parting means to said negative mask.

16. The photographic printer of claim 15 additionally comprising a cropping blade assembly on the side of said negative mask opposite said negative back-up plate.

17. The photographic printer of claim 15 additionally comprising:

a. housing means enclosing print material at said print material supporting means within light-excluding walls of a chamber not enclosing said lens structure therewithin, said chamber having a shutter-controllable window thereinto located in the path of said light beam between said lens carrier assembly and print material at said print material supporting means, and b. a shutter mechanism at said shutter-controllable window of said chamber, said shutter mechanism being adapted to be closed to block and opened to unblock the passage of said light beam through said window, said shutter mechanism being normally closed and adapted to be momentarily opened for passage of said light beam through said window for printing on said print material.

18. The photographic printer of claim 1 wherein said negative holder assembly comprises a. a foundation plate supported by said frame and adapted to permit the passage of said light beam centrally therethrough, b. a subassembly comprising a negative back-up plate adapted to permit the passage of said light beam centrally therethrough, said subassembly being supported by said foundation plate in substantially parallel relationship thereto, c. means for moving said subassembly in a rotary manner between positions at least at right angles to one another while said subassembly remains in said substantially parallel relationship to said foundation plate, d. a negative mask adapted to permit the passage of said light beam centrally therethrough and adapted to be juxtaposed in substantially parallel relationship to said negative support plate of said subassembly for movement in said rotary manner therewith, e. arm means mounted on said subassembly for movement in said rotary manner therewith, said arm means being mounted on said subassembly at a location out of the path of said light beam, f. means for interlocking said negative mask to said arm means, and g. means for actuating said arm means to part said negative mask from said negative back-up plate, said actuation means being adapted also to permit return of said negative mask to said juxtaposed relationship to said negative back-up plate.

19. The photographic printer of claim 1 wherein said lens carrier assembly consists essentially of said first subassembly and wherein said lens carrier assembly is supported by said frame through cooperatively mating members on said frame and said lens carrier assembly, said mating members being adapted to permit complete removal of said lens carrier assembly from said frame while said power means remains on said frame.

20. The photographic printer of claim 1 wherein said negative holder assembly comprises a negative back-up plate removable from said frame as a separate unit, said back-up plate having a recess therein adapted to receive a drawer, and a removable special effects drawer within said recess.

21. A lens carrier assembly for a photographic printer, said lens carrier assembly comprising a skeletal frame having substantially parallel spaced apart post members, a plurality of subframes mounted transversely upon said post members in substantially parallel spaced relationship to one another, each said subframe comprising a main track and an associated runner track in cooperative relationship, a plurality of lens boards having lens means mounted thereon, each said lens board being mounted on a said main track for slidable movement therealong, each said lens board having a member guided during said slidable movement by the respective associated runner track in cooperative relationship with the main track on which said lens board is mounted, means for incrementally adjusting each said subframe along said post members of said skeletal frame to thereby vary the spaced relationship between said lens boards, and releasable means for removably affixing said assembly between a print material and negative in a photographic printer.

22. The lens carrier assembly of claim 21 wherein said post members are threaded and said means for incrementally adjusting said subframes comprises cooperatively threaded members on said post members.

23. A photographic printer comprising a frame, a negative holder assembly supported by said frame, said assembly being adapted to support a negative for photographic printing, means supported by said frame on one side of said negative holder assembly and spaced apart therefrom for supporting light sensitive photographic print material, means supported by said frame on the opposite side of said negative holder assembly and spaced apart therefrom for projecting a light beam through a negative at said negative holder assembly toward print material at said print material supporting means, and lens means supported by said frame in the space between said negative holder assembly and said print material supporting means, said photographic printer being particularly characterized in that:

a. said print material supporting means is housed within light-excluding walls of a chamber not enclosing said lens means therewithin, said chamber having a shutter-controllable window thereinto located in the path of said light beam between said lens means and print material at said print material supporting means, b. said shutter-controllable window of said chamber is equipped at said window with a shutter mechanism capable of being closed to block and opened to unblock the passage of said light beam through said window, said shutter mechanism being normally closed and adapted to be momentarily opened for passage of said light beam through said window for printing on said print material, and c. said lens means is removable independently of said shutter mechanism.

24. The photographic printer of claim 23 wherein said shutter mechanism comprises a guide member and a pair of shutter members mounted to be guided in their movement by said guide member.

25. The photographic printer of claim 24 wherein each said shutter member is adapted to cover and block the passage of said light beam through said window independently of the other said shutter member, and wherein the movement of one said shutter member from a position of blocking to a position of unblocking is accomplished in a direction away from the position of the other said shutter member, said other shutter member being adapted to be subsequently moved in the same direction to a position of blocking, whereby the time of unblocking at each increment of distance along said window may be maintained at substantially the same leve, and wherein said unblocking of said window is accomplished by the movement of whichever said shutter member is in a position of blocking when unblocking is desired.

26. The photographic printer of claim 23 additionally characterized by the fact that said lens means comprises a removable lens carrier assembly carrying a plurality of different lens arrangements thereon, and means for removably supporting said lens carrier assembly at said lens means space on said frame.

27. The photographic printer of claim 23 wherein said negative holder assembly comprises a negative back-up plate and a negative mask adapted to be placed on opposite sides of a negative, and includes means for parting said negative mask from said negative back-up plate, and means for interlocking said parting means to said negative mask.

28. A photographic printer comprising a frame, a negative holder assembly supported by said frame, said assembly being adapted to support a negative for photographic printing, means supported by said frame on one side of said negative holder assembly and spaced apart therefrom for supporting light sensitive photographic print material, means supported by said frame on the opposite side of said negative holder assembly and spaced apart therefrom for projecting a light beam through a negative at said negative holder assembly toward print material at said print material supporting means, and lens means supported by said frame in the space between said negative holder assembly and said print material supporting means, said photographic printer being particularly characterized by the fact that said negative holder assembly comprises:
 a. a foundation plate supported by said frame and adapted to permit the passage of said light beam centrally therethrough,
 b. a subassembly comprising a negative back-up plate adapted to permit the passage of said light beam centrally therethrough, said subassembly being supported by said foundation plate in substantially parallel relationship thereto,
 c. means for moving said subassembly in a rotary manner between positions at least at right angles to one another while said subassembly remains in said substantially parallel relationship to said foundation plate,
 d. a negative mask adapted to permit the passage of said light beam centrally therethrough and adapted to be juxtaposed in substantially parallel relationship to said negative back-up plate of said subassembly for movement in said rotary manner therewith,
 e. arm means mounted on said subassembly for movement in said rotary manner therewith, said arm means being mounted on said subassembly at a location out of the path of said light beam,
 f. means for interlocking said negative mask to said arm means, and
 g. means for actuating said arm means to part said negative mask from said negative back-up plate, said actuation means being adapted also to permit return of said negative mask to said juxtaposed relationship to said negative back-up plate.

29. The photographic printer of claim 28 wherein said subassembly additionally comprises a base plate adapted to permit the passage of said light beam centrally therethrough, said base plate being interposed between said foundation plate and said negative back-up plate and being supported by said foundation plate, and means for releasably interlocking said negative back-up plate to said base plate, said negative back-up plate being completely removable from said base plate.

30. The photographic printer of claim 29 additionally comprising means for releasably interlocking said negative mask at a predetermined orientation on said negative back-up plate for removal as a unit with said negative back-up plate.

31. The photographic printer of claim 28 wherein said negative back-up plate comprises a structure having a recess within the path of said light beam and adapted to receive a drawer, and a removable special effects drawer within said recess.

32. The photographic printer of claim 28 wherein said actuation means for said arm means comprises an actuation plate mounted on said frame of said photographic printer in non-interlocked relationship to said arm means and adapted to cam against said arm means when actuated for parting of said negative mask from said negative back-up plate.

33. The photographic printer of claim 32 wherein said actuation means additionally comprises a foot pedal and a linkage between said foot pedal and said actuation plate.

34. The photographic printer of claim 28 additionally comprising a cropping blade assembly on the side of said negative mask opposite said negative back-up plate.

35. The photographic printer of claim 34 additionally comprising powered means mounted on said subassembly in normally spaced relationship from said cropping blade assembly but adapted to abut against said cropping blade assembly to effect adjustment of the position thereof.

36. The photographic printer of claim 28 additionally comprising:
 a. housing means enclosing print material at said print material supporting means within light-excluding walls of a chamber not enclosing said lens means therewithin, said chamber having a shutter-controllable window thereinto located in the path of said light beam between said lens means and print material at said print material supporting means, and
 b. a shutter mechanism at said shutter-controllable window of said chamber, said shutter mechanism being adapted to be closed to block and opened to unblock the passage of said light beam through said window.

37. The photographic printer of claim 24 additionally characterized by the fact that said lens means comprises a removable lens carrier assembly carrying a plurality of different lens arrangements thereon, and means for removably supporting said lens carrier assembly at said lens means space on said frame.

38. In a photographic printer comprising a frame, a negative holder assembly supported by said frame, said assembly being adapted to support a negative for photographic printing, means supported by said frame on one side of said negative holder assembly and spaced apart therefrom for supporting light sensitive photographic print material, and means supported by said frame on the opposite side of said negative holder assembly and spaced apart therefrom for projecting a light beam through a negative at said negative holder assembly toward print material at said print material supporting means, the improvements comprising, in combination:
 i. a lens carrier assembly supported by said frame, said lens carrier assembly including at least a first lens carrier subassembly supported in the space between said negative holder assembly and said print material supporting means, said first lens carrier subassembly consisting essentially of a plurality of lens boards each having different lens means mounted therein, each said lens board being mounted for movement within said subassembly between at least primary and secondary stations for the same, said primary station being a station normally occupied by a said lens board when at a position of rest in said subassembly, either said station for any said lens board of said subassembly being an operative station wherein the said lens board is located within the path of the light beam from said projecting means and the other said station for the said lens board being an inoperative station wherein the said lens board is located out of the path of said light beam, ii. power means supported by said frame, said power means being in engagable relationship with lens boards of said first lens carrier subassembly but disengagable therefrom, iii. means for actuating said power means to selectively move lens boards of said first lens carrier subassembly between said primary and secondary stations, iv. means for moving said first lens carrier subassembly as a unit out of said space when said power means is at a position of rest, which movement of said subassembly simultaneously moves each said lens board of said subassembly out of said engagable relationship with said power means, whereby an alternate lens carrier subassembly of different lens boards may be placed in an engagable relationship with said power means, and v. cooperatively mating members on said frame and on said lens carrier assembly, said mating members being adapted to permit complete removal of said lens carrier assembly as a separate distinct unitary structure, not including said power means, from its position of support by said frame when said power means is at said position of rest.

39. In a photographic printer comprising a frame, a negative holder assembly supported by said frame, said assembly being adapted to support a negative for photographic printing, means supported by said frame on one side of said negative holder assembly and spaced apart therefrom for supporting light sensitive photographic print material, and means supported by said frame on the opposite side of said negative holder assembly and spaced apart therefrom for projecting a light beam through a negative at said negative holder assembly toward print material at said print material supporting means, the improvements comprising, in combination:

i. a lens carrier assembly supported by said frame, said lens carrier assembly including at least a first lens carrier subassembly supported in the space between said negative holder assembly and said print material supporting means, said first lens carrier subassembly consisting essentially of a plurality of lens boards each having different lens means mounted therein, each said lens board being mounted for movement within said subassembly between at least primary and secondary stations for the same, said primary station being a station normally occupied by a said lens board when at a position of rest in said subassembly, either said station for any said lens board of said subassembly being an operative station wherein the said lens board is located within the path of the light beam from said projecting means and the other said station for the said lens board being an inoperative station wherein the said lens board is located out of the path of said light beam, ii. power means supported by said frame, said power means being in engagable relationship with lens boards of said first lens carrier subassembly but disengagable therefrom, iii. means for actuating said power means to selectively move lens boards of said first lens carrier subassembly between said primary and secondary stations, iv. stop means for preventing overtravel of each said lens board when such lens board is moved into said operative station, v. yielding means adapted to absorb any excess energy of motion effected by said power means after the movement of a said lens board is stopped by said stop means, and vi. means for moving said first lens carrier subassembly as a unit out of said space when said power means is at a position of rest, which movement of said subassembly simultaneously moves each said lens board of said subassembly out of said engagable relationship with said power means, whereby an alternate lens carrier subassembly of different lens boards may be placed in an engagable relationship with said power means.

40. In a photographic printer comprising a frame, a negative holder assembly supported by said frame, said assembly being adapted to support a negative for photographic printing, means supported by said frame on one side of said negative holder assembly and spaced apart therefrom for supporting light sensitive photographic print material, and means supported by said frame on the opposite side of said negative holder assembly and spaced apart therefrom for projecting a light beam through a negative at said negative holder assembly toward print material at said print material supporting means, the improvements comprising, in combination:

i. a lens carrier assembly supported by said frame, said lens carrier assembly consisting essentially of a first lens carrier subassembly supported in the space between said negative holder assembly and said print material supporting means, said first lens carrier subassembly consisting essentially of a plurality of lens boards mounted in substantially parallel stacked and spaced relationship to one another, each said lens board having different lens means mounted therein, each of said lens board being mounted for movement within said subassembly between at least primary and secondary stations for the same, said primary station being a station normally occupied by a said lens board when at a position of rest in said subassembly, either said station for any said lens board of said subassembly being an operative station wherein the said lens board is located within the path of the light beam from said projecting means and the other said station for the said lens board being an inoperative station wherein the said lens board is located out of the path of said light beam, ii. power means supported by said frame, said power means comprising a plurality of power members, each said power member being supported by said frame in engagable relationship with a respective lens board of said first lens carrier subassembly, but each said lens board being disengagable from said relationship, iii. means for actuating said power means to selectively move lens boards of said first lens carrier subassembly between said primary and secondary stations, and iv. cooperative means for complete removal and replacement of lens boards of said printer independently of and without removing said power means.

41. The photographic printer of claim 40 including cooperatively mating male and female members adapted to seat a replaced said lens board at the same focusing location established for it prior to removal of it.

42. The photographic printer of claim 40 including means for releasably locking a replaced said lens board in the space between said negative holder assembly and said print material supporting means.

43. The photographic printer of claim 40 including:
a. housing means enclosing print material at said print material supporting means within lightexcluding walls of a chamber not enclosing said lens boards therewithin, said chamber having a shutter-controllable window thereinto located in the path of said light beam, and
b. a shutter mechanism at said shutter-controllable window, said shutter mechanism being normally closed and adapted to be momentarily opened for passage of said light beam through said window for printing on said print material.

44. The photographic printer of claim 40 wherein said negative holder assembly comprises a negative back-up plate and a negative mask adapted to be placed on opposite sides of a negative, and means for complete removal and replacement of said negative holder assembly as a unit in said photographic printer.

45. The photographic printer of claim 23 additionally characterized by the fact that said photographic printer comprises more than one said lens means, each said lens means being movable between primary and secondary stations, one of said stations being an operative station wherein a said lens means is located within the path of the light beam from said projecting means.

* * * * *